Sept. 19, 1961   F. RÜMPELEIN   3,001,136
BEARING ARRANGEMENT
Filed Nov. 3, 1958   2 Sheets-Sheet 1

INVENTOR.
FRITZ RÜMPELEIN
BY MICHAEL S. STRIKER
ATTORNEY.

Sept. 19, 1961   F. RÜMPELEIN   3,001,136
BEARING ARRANGEMENT
Filed Nov. 3, 1958   2 Sheets-Sheet 2

INVENTOR.
FRITZ RÜMPELEIN
BY  Michael S. Striker
    Attorney.

3,001,136
BEARING ARRANGEMENT
Fritz Rümpelein, Munich, Germany, assignor to Agfa Aktiengesellschaft, Leverkusen-Bayerwerk, Germany
Filed Nov. 3, 1958, Ser. No. 771,357
Claims priority, application Germany Nov. 8, 1957
5 Claims. (Cl. 324—155)

The present invention relates to bearing arrangements.

More particularly, the present invention relates to bearing arrangements which are particularly suitable for use in delicate precise instruments such as electrical instruments where delicate moving parts are subject to shock.

Conventional bearing arrangements of this type have several disadvantages among which are the rapid wearing of precisely machined elements, and the necessity of precisely machining special surfaces on materials which are difficult to work.

One of the objects of the present invention is to provide a bearing arrangement of the above type in which the wear of the parts is reduced to a minimum so that repairs are very seldom required.

Another object of the present invention is to provide a bearing arrangement of the above type wherein jewel bearing elements, for example, which are difficult to machine, need not be provided with specially formed surfaces so that the cost of the bearing arrangement of the present invention is well below that of conventional bearing arrangements of the above type.

An additional object of the present invention is to provide a bearing arrangement which can withstand shocks in all directions while at the same time subjecting the parts of the bearing arrangement to very little wear.

Still another object of the present invention is to provide a bearing arrangement of the above type which is not only simple and robust, but which also is quite small and requires but little space so that the bearing arrangement of the present invention can be incorporated into devices such as exposure meters or the like which are to be incorporated into cameras.

It is also an object of the present invention to provide a bearing arrangement of the above type which makes it possible to very easily and conveniently assemble and disassemble the elements which are supported by the bearing arrangement of the invention.

With the above objects in view the present invention includes in an electrical instrument an annular rotor having an inner annular surface directed toward the axis of the rotor. A pair of diametrically opposed bearing block means are carried by the rotor at its inner annular surface, and a hollow core is surrounded by this rotor and has a pair of opposed end walls located between and respectively adjacent to the pair of bearing block means, these end walls being respectively formed with openings which are aligned with the pair of bearing block means. A pair of coaxial bearing pins extend with clearance through the openings of the end walls, respectively, into abutting engagement with the pair of bearing block means, respectively, and an elastic means supports the pair of bearing pins for yieldable movement toward and away from each other along their common axis as well as for yieldable radial movement with respect to their common axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
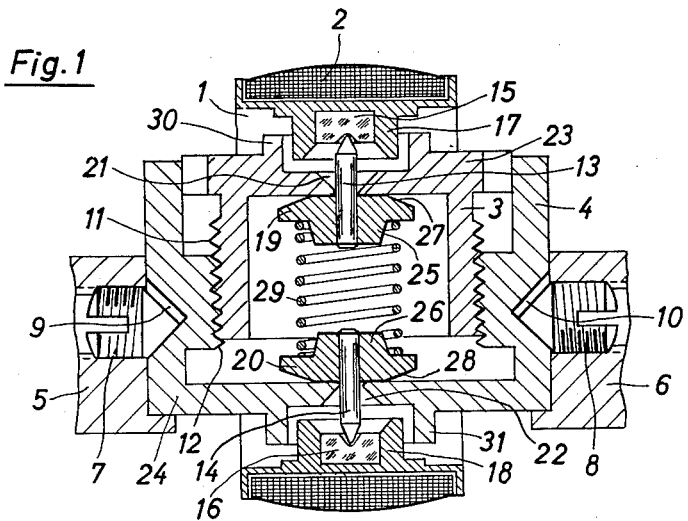
FIG. 1 is a sectional elevational view of that part of an electrical instrument which is provided with the bearing structure of the present invention.
Figure 2:
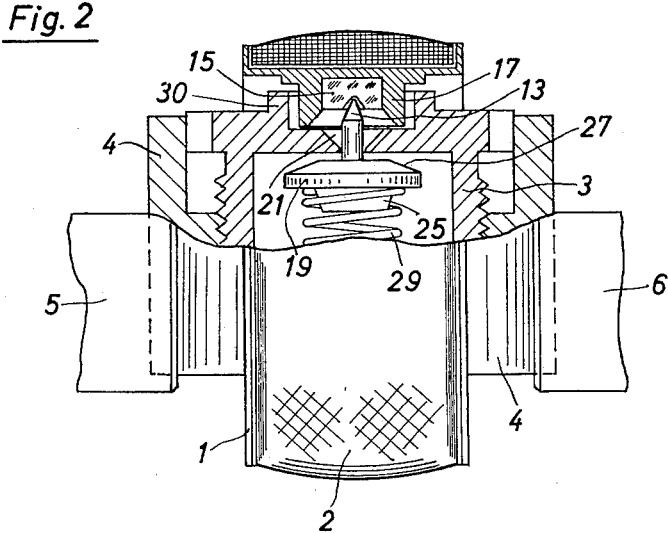
FIG. 2 shows the structure of FIG. 1 when it has been subjected to an axial shock.
Figure 3:
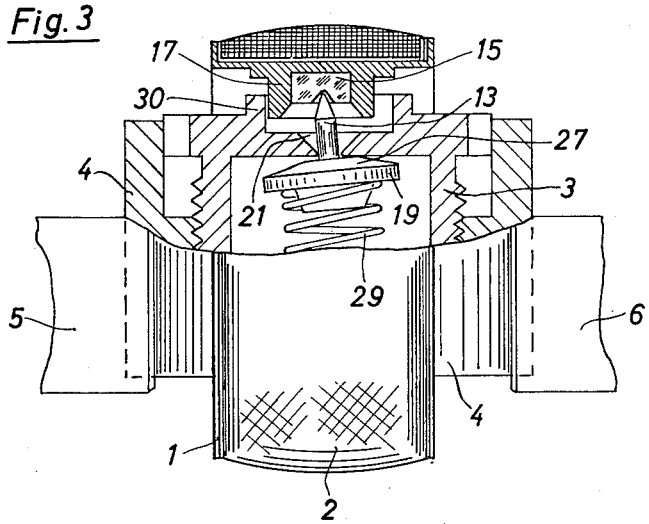
FIG. 3 shows the structure of FIG. 1 when it has been subjected to a radial shock.

Referring now to FIGS. 1–3, there is illustrated therein part of an electrical instrument which is particularly suitable for use as a photoelectric light meter or as a photoelectric control for the light of a camera. This electrical instrument includes an annular rotor 1, 2. This rotor includes the ring 1 which carries the coil 2. The ring 1 has an inner annular surface which is directed toward the axis of the rotor 1, 2, and a pair of diametrically opposed bearing means are carried by the rotor 1, 2 at its inner annular surface. As is evident from FIG. 1, one of these bearing block means includes the hollow cup-shaped receptacle 17 which is fixed integrally with the ring 1 and which supports in its interior the jewel bearing 15 which may be a sapphire, for example, and the other of the bearing block means includes a cup-shaped member 18 fixed, for example, integrally with the ring 1 and fixedly supporting in its interior a jewel bearing block 16 which may be identical with the block 15, this pair of bearing block means being directed toward the axis of the rotor. As is evident from FIG. 1, at their exposed faces which are directed toward the axis of the rotor the pair of jewels 15 and 16 are formed with conical recesses which are coaxial with each other.

The rotor 1, 2 surrounds a hollow core 3, 4. This core is made up of an inner member 3 provided with exterior threads and threadedly connected with the inner threads 12 of the outer core member 4. The exterior threads of the inner core member 3 are shown at 11. Thus, the threads 11 and 12 serve to connect the core members 3 and 4 to each other as well as to enable the adjustment thereof axially with respect to each other.

The rotor 1, 2 is surrounded in a well known manner by a permanent magnet which is carried by a suitable unillustrated support to which the rotor support members 5 and 6, fragmentarily illustrated in the drawings, are fixed. These support members 5 and 6 respectively are formed with threaded bores into which the screws 7 and 8 are threaded, and these screws 7 and 8 have conical ends directed toward each other, and are coaxial. The conical free ends of the screws 7 and 8 extend into the diametrically opposed conical recesses 9 and 10, respectively, formed in the exterior of the outer core member 4, so that the screws 7 and 8 serve to press the outer core member 4 against a pair of lower shoulders of the elements 5 and 6, as viewed in FIG. 1, in order to fix the core 3, 4 in this manner.

As may be seen from the drawings, the core member 3 is provided with an end wall 23 and the core member 4 is provided with an end wall 24, and these end walls 23, 24 are located between and respectively adjacent to the pair of block means 15, 16 and 17, 18. The core end wall 23 is formed with an opening 21 and the core end wall 24 is formed with an opening 22, and these openings 21 and 22 are coaxial with each other and aligned with the pair of jewel bearing blocks 15, 16, respectively. It will be noted that the openings 21 and 22 flare outwardly toward the pair of bearing blocks.

A pair of coaxial bearing pins 13 and 14 extend from the interior to the exterior of the hollow core 3, 4 through the openings 21 and 22 thereof, respectively, these bearing pins 13 and 14 extending with clearance through the openings 21 and 22, respectively, and respectively having free conical end means which extend into the conical recesses of the bearing blocks 15 and 16 and which abut against the bearing blocks 15 and 16 so as to support the rotor 1, 2 for turning movement.

It will be noted that the pair of coaxial bearing pins 13 and 14 extend radially with respect to the axis of the rotor 1, 2 from the interior to the exterior of the hollow core 3, 4. In accordance with the present invention an elastic support means is provided to support the pair of bearing pins 13 and 14 for yieldable movement along their common axis toward and away from each other as well as for yieldable radial movement with respect to their common axis, this elastic support means also serving to urge the pins 13 and 14 into abutting engagement with the pair of blocks 15 and 16, respectively. This elastic suport means includes a pair of pin carrier means 19 and 20. The carrier 19 as well as the carrier 20 are in the form of a pair of circular members fixed with the pins 13 and 14, respectively. The carrier 19 is provided with a frusto-conical surface 27 directed toward the end wall 23, and the carrier 20 is provided with a frustoconical surface 28 directed toward the end wall 24. The elastic support means includes in addition to the carriers 19 and 20 a coil spring 29 coiled around the common axis of the pins 13 and 14 and located between and abutting against the carriers 19 and 20 so as to urge the latter apart from each other. The carrier 19 has a frusto conical portion 25 directed away from the end wall 23 and the carrier 20 has a frustoconical portion 26 directed away from the end wall 24, and the end portions of the coil spring 29 surround the frustoconical portions 25 and 26, as is evident from FIG. 1.

The end wall 23 of the core is provided with an annular flange 30 which extends toward the inner surface of the rotor 1, 2 and which surrounds the cup-shaped member 17 with clearance, and the end wall 24 of the core is provided with an annular flange 31 coaxial with the flange 30, also extending outwardly toward the inner surface of the rotor 1, 2, and surrounding the cup-shaped member 18 with clearance.

During normal operation of the instrument the parts have the position shown in FIG. 1, and in accordance with the amount of current passing through the coil 2 the rotor 1, 2 will turn about the common axis of the bearing pins 13 and 14 without any appreciable friction to an extent determined by the amount of current in the winding 2.

If it should happen that the instrument is subjected to a shock extending along the common axis of the pins 13 and 14 in a downward direction, for example, as viewed in FIG. 1, then the pin 13 together with the pin carrier 19 will move downwardly toward the pin 14, the spring 29 yielding at this time, and if the shock is great enough the parts will reach the position indicated in FIG. 2 where the cup-shaped member 17 engages the end wall 23 of the hollow core, so that this end wall 23 serves as a limiting means for limiting the axial movement of the rotor together with the bearing pin 13 in a downward direction, as viewed in FIG. 1. Of course, if the shock is in an upward direction, as viewed in FIG. 1, then the cup-shaped member 18 will cooperate with the end wall 24 to limit the upward movement of the rotor and lower bearing members 14, 16.

If the instrument should be subjected to a radial shock which extends radially with respect to the common axis of the pins 13 and 14, then the carriers 19 and 20 will tilt with respect to the end walls of the core, and the frustoconical surfaces 27 and 28 of the carriers 19 and 20 permit such tilting movement to take place. Also the outward flaring of the openings 21 and 22 permit this tilting to take place. If this radial shock extends toward the left, as viewed in FIG. 1, then the parts will move toward the position indicated in FIG. 3, and it is apparent that the annular flanges 30 and 31 cooperate in this case with the cup-shaped members 17 and 18 to limit the extent of radial movement. The carrier 29 is shown in tilted position in FIG. 3, and the lower carrier member 20 is similarly tilted at this time. Of course, if the radial shock should be directed toward the right, as viewed in FIG. 1, then the rotor 1, 2 will move to the right and the flanges 30 and 31 will again cooperate with the cup-shaped members 17 and 18, respectively, to limit the tilt.

Thus, with the above-described structure of the invention the end walls of the hollow core as well as the annular flanges 30 and 31 serve to limit the extent to which the bearing pins 13 and 14 are loaded under shock in any direction. The smallest diameters of the openings 21 and 22 are only slightly greater than the diameters of the bearing pins 13 and 14, so that the latter are free to follow the movement of the rotor 1, 2 when it is subjected to shock while at the same time having no appreciable frictional rubbing with the cooperating parts of the structure so that the bearing pins 13 and 14 are not stressed to a substantial degree at any time and will have a long life. Their conical tips will not become rapidly worn and the bearing arrangement will operate over a long period of time without requiring any maintenance. This is in sharp contrast to an arrangement where the bearing pins are fixed to the rotor and cooperate with bearing blocks which are yieldably mounted. With an arrangement of this latter type in spite of the yieldable mounting of the bearing blocks the bearing pins are subjected to considerable wear and repairs are frequently required. Moreover, in the case of such a reversal of the structure of the invention where the bearing pins are fixed to the rotor and the bearing blocks are yieldably mounted, it becomes necessary to machine frustoconical surfaces on the jewels 15 and 16 which are made of sapphire, for example, and it is extremely difficult to machine such surfaces on jewels. This difficulty is avoided with the arrangement of the invention where the pin carriers 19 and 20 are simply made of metal and can be very easily and accurately machined so as to be provided with the frustoconical surfaces 27 and 28, respectively.

As soon as the force of a shock ceases the elastic support means 19, 20, 29 automatically returns the parts to their operating position shown in FIG. 1.

Figure 4:
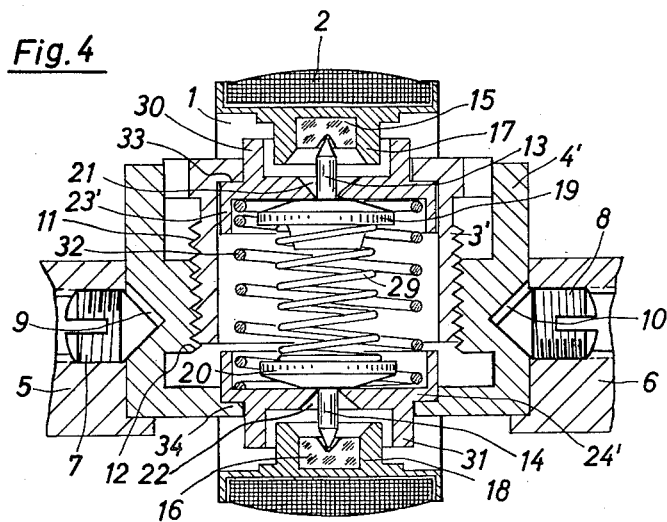
FIG. 4 shows an embodiment of the invention which is different from that of FIG. 1.

The embodiment of the invention which is illustrated in FIG. 4 is the same as that of FIGS. 1–3 except for the structure of the hollow core. In the embodiment of FIG. 4, the inner and outer core members 3′, 4′ are respectively provided with movable end walls 23′, 24′, respectively. These separate end walls 23′ and 24′ of the hollow core of FIG. 4 are movable toward and away from each other along the common axis of the bearing pins 13 and 14, and a coil spring 32 surrounds and is coaxial with the spring 29 and abuts against the end walls 23′, 24′ to urge the latter against the shoulders 33 and 34 of the hollow core members 3′, 4′, respectively, so that the end walls 23′ and 24′ are maintained by the springs 32 in the position illustrated in FIG. 4.

This construction of FIG. 4 provides advantages with respect to the assembly of the structure. With the embodiment of FIG. 4 the operator can easily depress the walls 23′ and 24′ inwardly toward each other while compressing the spring 32 so that the flanges 30 and 31 are located sufficiently close to each other to enable the cup-shaped members 17 and 18 to move across these flanges into coaxial alignment therewith, and then the operator need only release the end walls so that the spring 32 returns them to the position shown in FIG. 4 where the flanges 30 and 31 respectively surround the cup-shaped members 17 and 18, the bearing pins 13 and 14 automatically abutting against the blocks 15 and 16 in the manner shown in FIG. 4. In contrast, with the embodiment of FIGS. 1–3 it is necessary to turn the core members 3 and 4 with respect to each other in a direction which will shorten the length of the core until the flanges 30 and 31 are located close enough to each other to permit the cup-shaped members 17 and 18 to pass across these flanges into the position of axial alignment therewith, and then it is necessary to turn the core members 3 and 4 in the opposite direction with respect to each other until the pins 13 and 14 cooperate with the blocks 15 and 16, respectively, to provide the turnable support for the rotor 1, 2.

In both embodiments of the invention it is possible to turn either the core members 3 and 4 with respect to each other or the core members 3' and 4' with respect to each other until the bearing pins 13 and 14 have a frictional contact with the bearing blocks 15 and 16 which will provide the best possible pivotal support for the rotor with the least friction.

Of course, variations are possible in the structure of the invention. For example, the rotor may be in the form of a magnet instead of a winding. Also, the pin carriers 19 and 20 need not bear directly against the end walls 23 and 24, or 23' and 24' in the case of FIG. 4 These end walls may be provided at their inner surfaces with special elements against which the elements 19 and 20 respectively press, and the reference to end walls in this specification and the claims which follow is intended to cover either end walls as shown in the drawings or end walls provided at their inner surfaces with special elements against which the elements 19 and 20 directly bear. Furthermore, instead of a single spring 29 arranged between the carriers 19 and 20 a pair of springs may be provided and may respectively press against the elements 19 and 20 to urge the latter away from each other.

The yieldably supported bearing pins 13 and 14 of the invention may also be used at parts of an instrument other than the rotor bearings thereof.

It will be understood that each of the elements described above, or two or more together, may also find a useful application in other types of bearing arrangements differing from the types described above.

While the invention has been illustrated and described as embodied in bearing arrangements for electrical instruments, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrical instrument, in combination, a hollow rotor having inner opposed surface portions; a pair of opposed bearing blocks carried by said inner opposed surface portions of said rotor; a hollow core surrounded by said rotor and having a pair of opposed end walls respectively located between and adjacent said blocks and respectively formed with openings aligned with said blocks; a pair of coaxial bearing pins extending with clearance through said end wall openings into abutting engagement with said blocks, said pins extending substantially in a plane of symmetry of said rotor from the interior to the exterior of said core; a pair of pin carrier means located in said hollow core, respectively carrying said pins, and being tiltable with respect to said end walls of said hollow core; and spring means extending between and engaging with opposite ends thereof said carrier means and urging the latter apart from each other into engagement with said end walls, so that said bearing pins are axially yieldable toward and away from each other as well as radially yieldable with respect to their common axis.

2. In an electrical instrument, in combination, a hollow rotor having inner opposed surface portions; a pair of opposed bearing blocks carried by said rotor at said inner opposed surface portions thereof; a hollow core surrounded by said rotor and having a pair of opposed end walls located between and respectively adjacent to said blocks and respectively formed with openings aligned with said blocks, said end walls respectively having inner surfaces; a pair of coaxial bearing pins extending with clearance through said end wall openings into abutting engagement with said bearing blocks, said pins extending substantially in a plane of symmetry of said rotor from the interior of said hollow core to the exterior thereof; a pair of pin carriers respectively fixed to said pins in the interior of said core and respectively having frustoconical surfaces directed toward said inner surfaces of said ends walls of said hollow core, said frustoconical surfaces respectively having smaller ends respectively located nearer to said end walls than larger ends of said frustoconical surfaces, so that said carriers are tiltable with respect to said end walls; and spring means extending between and engaging with opposite ends thereof said carriers for urging the latter apart from each other toward said end walls, whereby said bearing pins are supported for yieldable movement axially toward and away from each other as well as for radial movement with respect to their common axis upon tilting of said carriers.

3. In an electrical instrument, in combination, a hollow rotor having inner opposed surface portions; a pair of opposed bearing block means carried by said rotor at said inner opposed surface portions thereof; a hollow core surrounded by said rotor and having a pair of diametrically opposed end wall means movable toward and away from each other with respect to the remainder of said hollow core and located between and respectively adjacent to said pair of bearing block means, said pair of end wall means respectively being formed with openings aligned with said pair of bearing block means; a pair of coaxial bearing pins extending with clearance through said openings of said pair of end wall means, respectively, into abutting engagement with said pair of bearing block means, respectively, said pair of bearing pins extending substantially in a plane of symmetry of said rotor from the interior to the exterior of said hollow core; and elastic support means cooperating with said pair of bearing pins for yieldably supporting the same for movement toward and away from each other along their common axis and for urging said bearing pins into engagement with said pair of bearing block means.

4. In an electrical instrument, in combination, a hollow rotor having inner opposed surface portions; a pair of opposed bearing block means carried by said rotor at said inner opposed surface portions thereof; a hollow core surrounded by said rotor and having a pair of diametrically opposed end wall means movable toward and away from each other with respect to the remainder of said hollow core and located between and respectively adjacent to said pair of bearing block means, said pair of end wall means respectively being formed with openings aligned with said pair of bearing block means; a pair of coaxial bearing pins extending with clearance through said openings of said pair of end wall means, respectively, into abutting engagement with said pair of bearing block means, respectively, said pair of bearing pins extending substantially in a plane of symmetry of said rotor from the interior to the exterior of said hollow core; and elastic support means cooperating with said pair of bearing pins for yieldably supporting the same for movement toward and away from each other along their common axis and for urging said bearing pins into engagement with said pair of bearing block means; and spring means located in said hollow core and engaging said pair of end wall means for urging the latter apart from each other, said hollow core having limiting portions engaging said pair of end wall means for limiting the movement thereof apart from each other.

5. In an electrical instrument, in combination, a hollow rotor having inner opposed surface portions; a pair of opposed bearing block means carried by said rotor at said inner opposed surface portions thereof; a hollow core surrounded by said rotor and having a pair of diametrically opposed end wall means movable toward and away from each other with respect to the remainder of said hollow core and located between and respectively adjacent to said pair of bearing block means, said pair of end wall means respectively being formed with openings aligned with said pair of bearing block means; a pair of coaxial bearing pins extending with clearance through said openings of said pair of end wall means, respectively, into abutting engagement with said pair of bearing block means, respectively, said pair of bearing pins extending substantially in a plane of symmetry of said rotor from the interior to the exterior of said hollow core; and elastic support means cooperating with said pair of bearing pins for yieldably supporting the same for movement toward and away from each other along their common axis and for urging said bearing pins into engagement with said pair of bearing block means; and spring means located in said hollow core and engaging said pair of end wall means for urging the latter apart from each other, said hollow core having limiting portions engaging said pair of end wall means for limiting the movement thereof apart from each other, said spring means being in a form of a coil spring having opposite ends respectively pressing against said pair of end wall means, and said yieldable support means including a second coil spring coaxial with and surrounded by said first-mentioned coil spring.

References Cited in the file of this patent

UNITED STATES PATENTS

| | | |
|---|---|---|
| 661,127 | La Roche | Nov. 6, 1900 |
| 2,092,281 | Knopp | Sept. 7, 1937 |

FOREIGN PATENTS

| | | |
|---|---|---|
| 631,352 | Great Britain | Nov. 1, 1949 |
| 746,267 | Great Britain | Mar. 14, 1956 |
| 951,744 | Germany | Oct. 31, 1956 |